(12) United States Patent
Lin

(10) Patent No.: US 9,619,102 B2
(45) Date of Patent: Apr. 11, 2017

(54) METHOD AND APPARATUS FOR PRESENTING IMAGES, MOBILE TERMINAL AND COMPUTER STORAGE MEDIUM

(71) Applicant: TENCENT TECHNOLOGY (SHENZHEN) COMPANY LIMITED, Shenzhen, Guangdong (CN)

(72) Inventor: Zheng Lin, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 237 days.

(21) Appl. No.: 14/401,605

(22) PCT Filed: Jun. 4, 2013

(86) PCT No.: PCT/CN2013/076718
§ 371 (c)(1),
(2) Date: Nov. 17, 2014

(87) PCT Pub. No.: WO2013/185549
PCT Pub. Date: Dec. 19, 2013

(65) Prior Publication Data
US 2015/0153907 A1    Jun. 4, 2015

(30) Foreign Application Priority Data

Jun. 12, 2012 (CN) .......................... 2012 1 0192566

(51) Int. Cl.
*G06F 3/0481* (2013.01)
*G06F 17/30* (2006.01)

(52) U.S. Cl.
CPC ...... *G06F 3/0481* (2013.01); *G06F 17/30274* (2013.01)

(58) Field of Classification Search
CPC .................................................... G06F 3/0481
See application file for complete search history.

(56) References Cited

U.S. PATENT DOCUMENTS

2001/0009428 A1* 7/2001 Dow ................. H04N 1/00127
715/854
2009/0303178 A1* 12/2009 Koda ............... G06F 17/30038
345/156

(Continued)

FOREIGN PATENT DOCUMENTS

| CN | 101794567 A | 8/2010 |
| CN | 101882160 A | 11/2010 |

(Continued)

OTHER PUBLICATIONS

International Search Report in international application No. PCT/CN2013/076718, mailed on Oct. 10, 2013.

(Continued)

*Primary Examiner* — Anil Bhargava
(74) *Attorney, Agent, or Firm* — Oppedahl Patent Law Firm LLC

(57) ABSTRACT

Provided are a method and apparatus for presenting images, a mobile terminal and a computer storage medium. The method includes: an instruction to present images in a folder is received; a predefined number of images are loaded to a screen of a device so as to be presented thereon, the predefined number is the quantity of images capable of being presented by the screen of the device; an instruction to move a display interface forward is received; it is determined in real time whether images presented on the screen of the device are hidden beyond the screen of the device after the display interface is moved forward, if Yes, memory space of images hidden beyond the screen of the device are recovered and images, as many as images with their memory space recovered, arranged behind the predefined number of (Continued)

images presented on the screen of the device in the folder are loaded to the screen of the device so as to be presented thereon. Through the disclosure, memory occupation and CPU consumption of presentation of a large number of images can be reduced to the most extent so that the large number of images are presented rapidly, efficiently and smoothly on a device, thereby improving greatly operation efficiencies of the device and applications.

12 Claims, 2 Drawing Sheets

(56) References Cited

U.S. PATENT DOCUMENTS

2010/0164991 A1* 7/2010 Watanabe .......... G06F 3/04883
    345/635
2010/0304791 A1  12/2010 Lee

FOREIGN PATENT DOCUMENTS

| CN | 101895635 A | 11/2010 |
| CN | 102023679 A | 4/2011 |

OTHER PUBLICATIONS

English Translation of the Written Opinion of the International Search Authority in international application No. PCT/CN2013/076718, mailed on Oct. 10, 2013.
Notification of the First Office Action of Chinese application No. 201210192566.X, issued on Nov. 2, 2015.

* cited by examiner

METHOD AND APPARATUS FOR PRESENTING IMAGES, MOBILE TERMINAL AND COMPUTER STORAGE MEDIUM

This application claims the priority of Chinese Patent Application No. 201210192566.X filed on Jun. 12, 2012 and entitled "METHOD AND APPARATUS FOR PRESENTING IMAGES AND MOBILE TERMINAL" under Tencent Technology (Shenzhen) Company Limited, the content of which is incorporated herein by reference in its entirety.

TECHNICAL FIELD

The disclosure relates to the field of display, and in particular to a method and apparatus for presenting images, a mobile terminal and a computer storage medium.

BACKGROUD

With the development of mobile terminal techniques, most of current mobile terminals have a camera and a high-capacity storage card, thus a large number of images are generally stored in a mobile terminal. A Windows Phone 7 mobile terminal of the prior art usually presents images in this way: loading all images at a time and then presenting all the images on the screen of the mobile terminal by scrolling a display interface. For example, if there are 100 images to be presented and 6 images can be presented at a time by a screen of a mobile terminal, when a user is desired to present images, the mobile terminal loads the 100 images at a time, then first 6 images are presented on the screen of the mobile terminal after the completion of the loading, other images are displayed successively on the screen of the mobile terminal when the user is scrolling the display interface, thus during the whole presentation the 100 images are occupying memory space all the time. Therefore, this method consumes too much memory space, thereby lowering operation efficiencies of the mobile terminal and applications.

SUMMARY

The embodiments of the disclosure is to provide a method for presenting images, which can solve the problem in the prior art that too much memory of a mobile terminal is consumed when images are presented.

The embodiments of the disclosure are implemented as follows. A method for presenting images includes the following steps:

an instruction to present images in a folder is received;

a predefined number of images are loaded to a screen of a device so as to be presented thereon, and the predefined number is the quantity of images capable of being presented by the screen of the device;

an instruction to move a display interface forward is received;

it is determined in real time whether images presented on the screen of the device are hidden beyond the screen of the device after the display interface is moved forward; if images presented on the screen of the device are hidden beyond the screen of the device, memory space of images hidden beyond the screen of the device are recovered and images, as many as images with their memory space recovered, arranged behind the predefined number of images presented on the screen of the device in the folder are loaded to the screen of the device so as to be presented thereon.

The embodiments of the disclosure provide an apparatus for presenting images, and the apparatus includes:

a presentation instruction reception module configured to receive an instruction to present images in a folder;

a first loading module configured to load a predefined number of images to a screen of a device so as to present the images thereon, the predefined number being the quantity of images capable of being presented by the screen of the device;

a first move instruction reception module configured to receive an instruction to move a display interface forward;

a first determination module configured to determine in real time whether images presented on the screen of the device are hidden beyond the screen of the device after the display interface is moved forward;

a first recovering module configured to, when it is determined by the first determination module that images presented on the screen of the device are hidden beyond the screen of the device after the display interface is moved forward, recover memory space of images hidden beyond the screen of the device; and a second loading module configured to, when it is determined by the first determination module that images presented on the screen of the device are hidden beyond the screen of the device after the display interface is moved forward, load to the screen of the device images, as many as images with their memory space recovered, arranged behind the predefined number of images presented on the screen of the device in the folder so as to present the loaded images thereon.

The embodiments of the disclosure further provide a mobile terminal including the above apparatus for presenting images.

The embodiments of the disclosure further provide a computer storage medium including a set of computer-readable instructions, and the computer-readable instructions are configured to implement the method for presenting images according to the embodiments of the disclosure.

In the embodiments of the disclosure, only images capable of being presented by a screen of a device are loaded, and it is determined in real time whether images presented on the screen of the device are hidden beyond the screen of the device after the display interface is moved forward, if images presented on the screen of the device are hidden beyond the screen of the device, memory space of images hidden beyond the screen of the device are recovered and images, as many as images with their memory space recovered, arranged behind the predefined number of images presented on the screen of the device in the folder are loaded to the screen of the device so as to be presented thereon, therefore memory occupation and CPU consumption of presentation of a large number of images can be reduced to the most extent so that the large number of images are presented rapidly, efficiently and smoothly on a device, thereby improving greatly operation efficiencies of the device and applications.

DETAILED DESCRIPTION

In order to make objectives, technical solutions and beneficial effects of the disclosure more clear, the disclosure will be further elaborated below in conjunction with the accompanying drawings and embodiments. It should be understood that the specific embodiments are only used to interpret the disclosure instead of limiting the disclosure.

Figure 1:
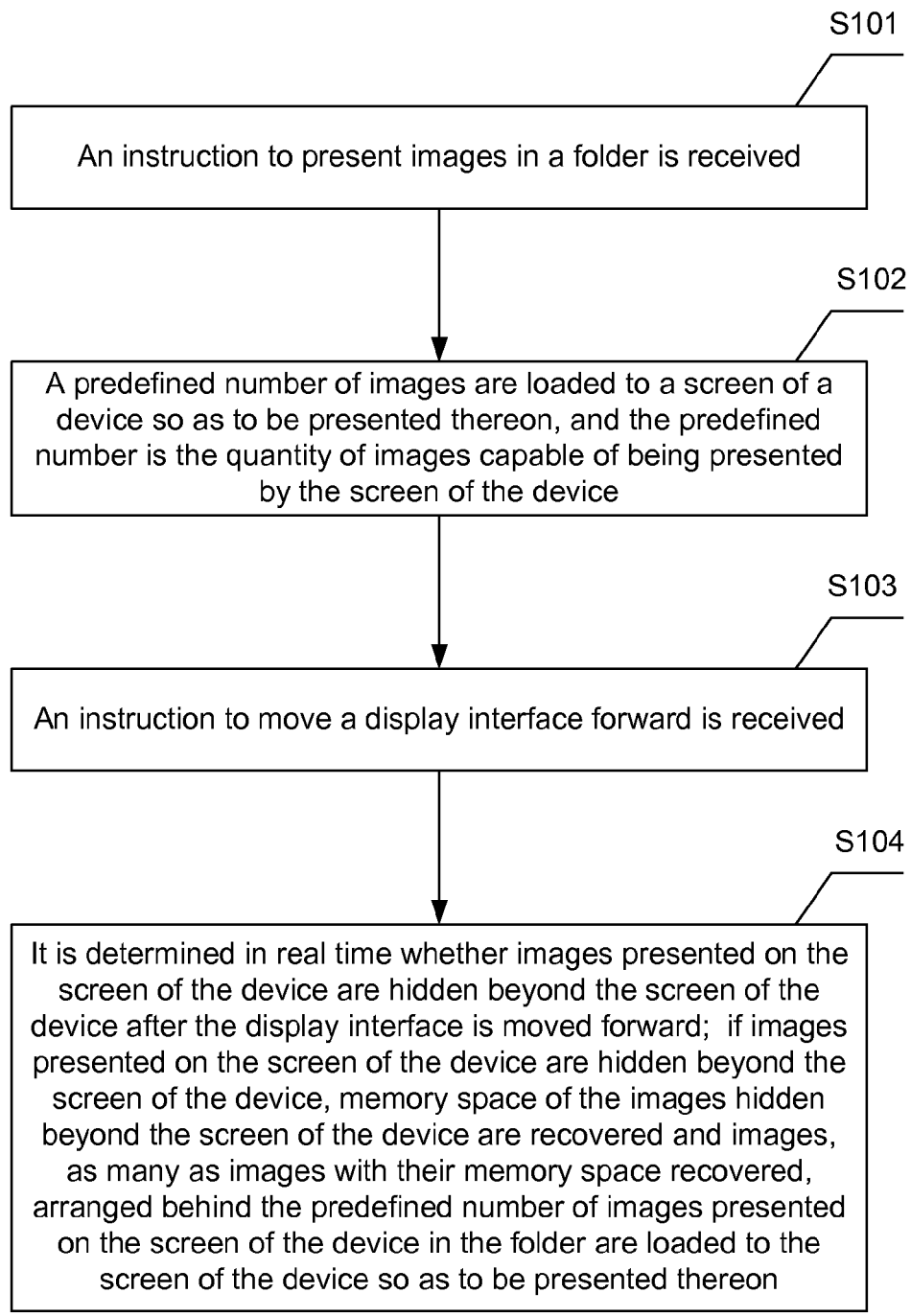
FIG. 1 is a flow chart of a method for presenting images provided by a first embodiment of the disclosure.

Referring to FIG. 1, a method for presenting images provided by a first embodiment of the disclosure includes the following steps:

In step S101, an instruction to present images in a folder is received.

In step S102, a predefined number of images are loaded to a screen of a device so as to be presented thereon. The predefined number is the quantity of images capable of being presented by the screen of the device.

For example, if a screen of a device can present 6 images, first 6 images are loaded to the screen of the device so as to be presented thereon, i.e., the first 6 images are presented on the screen of the device.

In step S103, an instruction to move a display interface forward is received.

In the first embodiment of the disclosure, the instruction to move a display interface forward can be an instruction to move the display interface upward or an instruction to move the display interface to the left.

In step S104, it is determined in real time whether images presented on the screen of the device are hidden beyond the screen of the device after the display interface is moved forward; if images presented on the screen of the device are hidden beyond the screen of the device, memory space of images hidden beyond the screen of the device are recovered and images, as many as images with their memory space recovered, arranged behind the predefined number of images presented on the screen of the device in the folder are loaded to the screen of the device so as to be presented thereon.

Assuming that the instruction to move a display interface forward is an instruction to move the display interface upward, and in step S102 the first 6 images are presented on the screen of the device, if the display interface can present 2 images per row, when it is determined that two images in a first row of the display interface are hidden beyond the screen of the device, memory space of the two images are recovered, and two images behind the first 6 images are loaded to the screen of the device so as to be presented thereon.

In the first embodiment of the disclosure, after the step S104, the method may further include the following steps:

an instruction to move a display interface backward is received;

In the first embodiment of the disclosure, the instruction to move a display interface backward is an instruction to move the display interface downward or an instruction to move the display interface to the right.

It is determined in real time whether images presented on the screen of the device are hidden beyond the screen of the device after the display interface is moved backward; if images presented on the screen of the device are hidden beyond the screen of the device, memory space of the images hidden beyond the screen of the device are recovered and images, as many as images with their memory space recovered, arranged before the images presented on the screen of the device in the folder are loaded to the screen of the device so as to be presented thereon.

In the first embodiment of the disclosure, assuming that the instruction to move a display interface backward is an instruction to move the display interface downward, and in step S104 6 images are presented on the screen of the device, if the display interface can present 2 images per row, when it is determined that two images in the last row of the display interface are hidden beyond the screen of the device, memory space of the two images are recovered, and two images before the 6 images presented on the screen of the device in step S104 are loaded to the screen of the device so as to be presented thereon.

Figure 2:
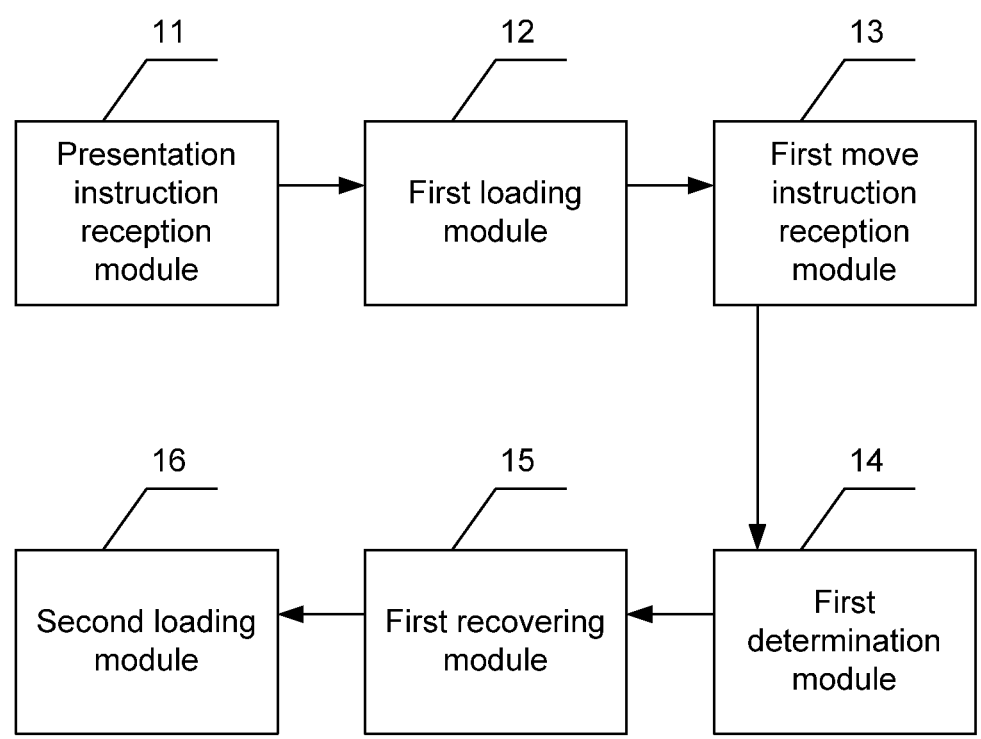
FIG. 2 is a block diagram showing functional modules of an apparatus for presenting images provided by a second embodiment of the disclosure.

FIG. 2 is a block diagram showing functional modules of an apparatus for presenting images provided by a second embodiment of the disclosure. For expositional convenience, only portions associated with the embodiments of the disclosure are shown. The apparatus for presenting images is a software unit, a hardware unit or a combination thereof built in a mobile terminal. The apparatus for presenting images provided by a second embodiment of the disclosure includes a presentation instruction reception module 11, a first loading module 12, a first move instruction reception module 13, a first determination module 14, a first recovering module 15 and a second loading module 16.

The presentation instruction reception module 11 is configured to receive an instruction to present images in a folder.

The first loading module 12 is configured to load a predefined number of images to a screen of a device so as to present the images thereon, and the predefined number is the quantity of images capable of being presented by the screen of the device;

For example, if a screen of a device can present 6 images, first 6 images are loaded to the screen of the device so as to be presented thereon, i.e., the first 6 images are presented on the screen of the device.

The first move instruction reception module 13 is configured to receive an instruction to move a display interface forward.

In the second embodiment of the disclosure, the instruction to move a display interface forward can be an instruction to move the display interface upward or an instruction to move the display interface to the left.

The first determination module 14 is configured to determine in real time whether images presented on the screen of the device are hidden beyond the screen of the device after the display interface is moved forward.

The first recovering module 15 is configured to, when it is determined by the first determination module 14 that images presented on the screen of the device are hidden beyond the screen of the device after the display interface is moved forward, recover memory space of images hidden beyond the screen of the device.

The second loading module 16 is configured to, when it is determined by the first determination module 14 that images presented on the screen of the device are hidden beyond the screen of the device after the display interface is moved forward, load to the screen of the device images, as many as images with their memory space recovered, arranged behind the predefined number of images presented on the screen of the device in the folder so as to present the loaded images thereon.

For example, the instruction to move a display interface forward is an instruction to move the display interface upward, and the first loading module 12 loads first 6 images, i.e., the first 6 images are presented on the screen of the device, if the display interface can present 2 images per row, when it is determined that two images in a first row of the display interface are hidden beyond the screen of the device, memory space of the two images are recovered, and two images behind the first 6 images are loaded to the screen of the device so as to be presented thereon.

In the second embodiment of the disclosure, the apparatus for presenting images may further include a second move instruction reception module, a second determination module, a second recovering module and a third loading module.

The second move instruction reception module is configured to receive an instruction to move a display interface backward.

In the second embodiment of the disclosure, the instruction to move a display interface backward is an instruction to move the display interface downward or an instruction to move the display interface to the right.

The second determination module is configured to determine in real time whether images presented on the screen of the device are hidden beyond the screen of the device after the display interface is moved backward.

The second recovering module is configured to, when it is determined by the second determination module that images presented on the screen of the device are hidden beyond the screen of the device after the display interface is moved backward, recover memory space of images hidden beyond the screen of the device.

The third loading module is configured to, when it is determined by the second determination module that images presented on the screen of the device are hidden beyond the screen of the device after the display interface is moved backward, load to the screen of the device images, as many as images with their memory space recovered, arranged before the images presented on the screen of the device in the folder so as to present the loaded images thereon.

In the second embodiment of the disclosure, for example, the instruction to move a display interface backward is an instruction to move the display interface downward, and 6 images are presented on the screen of the device after being loaded by the second loading module 16, if the display interface can present 2 images per row, when it is determined that two images in the last row of the display interface are hidden beyond the screen of the device, memory space of the two images are recovered, and two images before the 6 images presented on the screen of the device are loaded to the screen of the device so as to be presented thereon.

A third embodiment of the disclosure further provides a mobile terminal including the apparatus for presenting images provided by the second embodiment of the disclosure.

In the embodiments of the disclosure, only images capable of being presented by a screen of a device are loaded, and it is determined in real time whether images presented on the screen of the device are hidden beyond the screen of the device after the display interface is moved forward, if images presented on the screen of the device are hidden beyond the screen of the device, memory space of images hidden beyond the screen of the device are recovered and images, as many as images with their memory space recovered, arranged behind the predefined number of images presented on the screen of the device in the folder are loaded to the screen of the device so as to be presented thereon, therefore memory occupation and CPU consumption of presentation of a large number of images can be reduced to the most extent so that the large number of images are presented rapidly, efficiently and smoothly on a device, thereby improving greatly operation efficiencies of the device and applications.

Those skilled in the art should understand that all or part of the steps in the method according to the above embodiments may be implemented by related hardwares under instructions of a program, which may be stored in a computer readable storage medium including a ROM/RAM, magnetic disk, optical disk, and the like. Therefore, the embodiments of the disclosure further provide a computer storage medium including a set of computer-readable instructions, and the computer-readable instructions are configured to implement the method for presenting images according to the embodiments of the disclosure.

What described are merely preferable embodiments of the disclosure, and are not intended to limit the disclosure. All modifications, replacements and improvements made within the spirit and principles of the disclosure should be included within the scope of protection of the disclosure.

The invention claimed is:

1. A method for presenting images, comprising:
receiving an instruction to present images in a folder;
loading a predefined number of images to a random access memory (RAM) of a device so as to present the images on a screen of the device, wherein the predefined number is a quantity of images capable of being presented by the screen of the device in a single screen page, and a number of the images in the folder is greater than the predefined number;
receiving an instruction to move a display interface forward;
determining in real time whether images presented on the screen of the device are hidden beyond the screen of the device after the display interface is moved forward; and
when images presented on the screen of the device are hidden beyond the screen of the device, recovering RAM space of the images hidden beyond the screen of the device and loading to the RAM of the device images, as many as images with their RAM space recovered, arranged behind the predefined number of images presented on the screen of the device in the folder so as to present the loaded images on the screen of the device.

2. The method according to claim 1, wherein the instruction to move a display interface forward is an instruction to move the display interface upward or an instruction to move the display interface to the left.

3. The method according to claim 1, further comprising the step, after the step of recovering RAM space of the images hidden beyond the screen of the device and loading to the RAM of the device images, as many as images with their RAM space recovered, arranged behind the predefined number of images presented on the screen of the device in the folder so as to present the loaded images on the screen of the device, of:
receiving an instruction to move a display interface backward;
determining in real time whether images presented on the screen of the device are hidden beyond the screen of the device after the display interface is moved backward; and
when images presented on the screen of the device are hidden beyond the screen of the device, recovering RAM space of the images hidden beyond the screen of the device and loading to the RAM of the device images, as many as images with their RAM space recovered, arranged before the images presented on the screen of the device in the folder so as to present the loaded images on the screen of the device.

4. The method according to claim 3, wherein the instruction to move a display interface backward is an instruction to move the display interface downward or an instruction to move the display interface to the right.

5. A mobile terminal, comprising:
a screen;
a random access memory (RAM);
a processor;

a non-transitory computer storage medium including a set of computer-readable instructions, when executed, cause the processor to:

receive an instruction to present images in a folder;

load a predefined number of images to the RAM of the mobile terminal so as to present the images on the screen of the mobile terminal, wherein the predefined number is a quantity of images capable of being presented by the screen of the mobile terminal in a single screen page, and a number of the images in the folder is greater than the predefined number;

receive an instruction to move a display interface forward;

determine in real time whether images presented on the screen of the mobile terminal are hidden beyond the screen of the mobile terminal after the display interface is moved forward;

when it is determined by the first determination module that images presented on the screen of the mobile terminal are hidden beyond the screen of the mobile terminal after the display interface is moved forward, recover random access memory (RAM) space of the images hidden beyond the screen of the mobile terminal; and when it is determined by the first determination module that images presented on the screen of the mobile terminal are hidden beyond the screen of the mobile terminal after the display interface is moved forward, load to the RAM of the device images, as many as images with their RAM space recovered, arranged behind the predefined number of images presented on the screen of the mobile terminal in the folder so as to present the loaded images on the screen of the device.

6. The mobile terminal according to claim 5, wherein the instruction to move a display interface forward is an instruction to move the display interface upward or an instruction to move the display interface to the left.

7. The mobile terminal according to claim 5, wherein the non-transitory computer storage medium further includes a further set of computer-readable instructions, when executed, cause the processor to:

receive an instruction to move a display interface backward;

determine in real time whether images presented on the screen of the device are hidden beyond the screen of the mobile terminal after the display interface is moved backward;

when it is determined by the second determination module that images presented on the screen of the mobile terminal are hidden beyond the screen of the device after the display interface is moved backward, recover RAM space of the images hidden beyond the screen of the mobile terminal; and when it is determined by the second determination module that images presented on the screen of the mobile terminal are hidden beyond the screen of the device after the display interface is moved backward, load to the RAM of the device images, as many as images with their RAM space recovered, arranged before the images presented on the screen of the device in the folder so as to present the loaded images on the screen of the device.

8. The mobile terminal according to claim 7, wherein the instruction to move a display interface backward is an instruction to move the display interface downward or an instruction to move the display interface to the right.

9. A non-transitory computer storage medium including a set of computer-readable instructions that, when executed, implement a method for presenting images, wherein the method for presenting images comprises:

receiving an instruction to present images in a folder;

loading a predefined number of images to a random access memory (RAM) of a device so as to present the images on a screen of the device, wherein the predefined number is a quantity of images capable of being presented by the screen of the device in a single screen page, and a number of the images in the folder is greater than the predefined number;

receiving an instruction to move a display interface forward;

determining in real time whether images presented on the screen of the device are hidden beyond the screen of the device after the display interface is moved forward; and when images presented on the screen of the device are hidden beyond the screen of the device, recovering RAM space of the images hidden beyond the screen of the device and loading to the RAM of the device images, as many as images with their RAM space recovered, arranged behind the predefined number of images presented on the screen of the device in the folder so as to present the loaded images on the screen of the device.

10. The non-transitory computer storage medium according to claim 9, wherein the instruction to move a display interface forward is an instruction to move the display interface upward or an instruction to move the display interface to the left.

11. The non-transitory computer storage medium according to claim 9, wherein the method for presenting images further comprises the step, after the step of recovering RAM space of the images hidden beyond the screen of the device and loading to the RAM of the device images, as many as images with their RAM space recovered, arranged behind the predefined number of images presented on the screen of the device in the folder so as to present the loaded images on the screen of the device, of:

receiving an instruction to move a display interface backward;

determining in real time whether images presented on the screen of the device are hidden beyond the screen of the device after the display interface is moved backward; and when images presented on the screen of the device are hidden beyond the screen of the device, recovering RAM space of the images hidden beyond the screen of the device and loading to the RAM of the device images, as many as images with their RAM space recovered, arranged before the images presented on the screen of the device in the folder so as to present the loaded images on the screen of the device.

12. The non-transitory computer storage medium according to claim 11, wherein the instruction to move a display interface backward is an instruction to move the display interface downward or an instruction to move the display interface to the right.

* * * * *